United States Patent
Freund et al.

(10) Patent No.: US 11,232,119 B2
(45) Date of Patent: *Jan. 25, 2022

(54) SERVING CONTENT ITEMS IN CONTENT ITEM SLOTS BASED ON A REFERRAL QUERY LOCATION

(71) Applicant: Google LLC, Mountain View, CA (US)

(72) Inventors: Martin Brandt Freund, Mountain View, CA (US); Yuanying Xie, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/699,397

(22) Filed: Nov. 29, 2019

(65) Prior Publication Data

US 2020/0097467 A1 Mar. 26, 2020

Related U.S. Application Data

(63) Continuation of application No. 14/021,386, filed on Sep. 9, 2013, now Pat. No. 10,496,660.

(51) Int. Cl.
*G06Q 30/00* (2012.01)
*G06F 16/248* (2019.01)

(52) U.S. Cl.
CPC .................. *G06F 16/248* (2019.01)

(58) Field of Classification Search
CPC ..................... G06F 16/9537; G06F 16/248
USPC ....................................................... 705/14.73
See application file for complete search history.

(56) References Cited

U.S. PATENT DOCUMENTS

| | | | |
|---|---|---|---|
| 8,296,179 B1 | 10/2012 | Rennison | |
| 8,335,721 B2 | 12/2012 | Samdadiya et al. | |
| 2003/0149618 A1 | 8/2003 | Sender et al. | |
| 2005/0137958 A1 | 6/2005 | Huber et al. | |
| 2008/0133314 A1 | 6/2008 | Chiu | |
| 2009/0248513 A1* | 10/2009 | Aggarwal | G06Q 30/0242 705/14.72 |
| 2012/0158705 A1* | 6/2012 | Konig | G06F 16/58 707/723 |
| 2013/0019202 A1* | 1/2013 | Regan | G06F 16/9535 715/810 |

OTHER PUBLICATIONS

Final Office Action on U.S. Appl. No. 14/021,386 dated Apr. 11, 2019 (37 pages).

(Continued)

*Primary Examiner* — Sun M Li
(74) *Attorney, Agent, or Firm* — Marshall, Gerstein & Borun LLP

(57) ABSTRACT

Content items may be selected and served with a resource such that each content item is displayed in a corresponding content item slot based on a determined order. The determined order may be based on content of the resource and a referral query. A referral query location of the resource may be based on the referral query and data indicative of content of the resource. In some implementations, the determined order may be based on a predictive model and the referral query location. The predictive model may be based on aggregate historical data of interactions. In some implementations, the determined order may be based on a proximity of a content item slot relative to the referral query location.

14 Claims, 8 Drawing Sheets

(56) References Cited

OTHER PUBLICATIONS

Non-Final Office Action on U.S. Appl. No. 14/021,386 dated Oct. 16, 2018 (20 pages).
Notice of Allowance on U.S. Appl. No. 14/021,386 dated Jul. 30, 2019 (17 pages).
Schroedl, et al., "Personalized Ad Placement in Web Search," ADKDD'10, Jul. 25, 2010 (9 pages).

* cited by examiner

SERVING CONTENT ITEMS IN CONTENT ITEM SLOTS BASED ON A REFERRAL QUERY LOCATION

CROSS-REFERENCE TO RELATED APPLICATIONS

This application claims the benefit of priority under 35 U.S.C. § 120 as a continuation of U.S. patent application Ser. No. 14/021,386, filed Sep. 9, 2013, entitled "Serving Content Items in Content Item Slots Based on a Referral Query Location," the entire contents of which is hereby incorporated by reference in its entirety.

BACKGROUND

In a networked environment, such as the Internet or other networks, first-party content providers can provide information for public presentation on resources, for example web pages, documents, applications, and/or other resources. The first-party content can include text, video, and/or audio information provided by the first-party content providers via, for example, a resource server for presentation on a client device over the Internet. Additional third-party content can also be provided by third-party content providers for presentation on the client device together with the first-party content provided by the first-party content providers. Thus, a person viewing a resource can access the first-party content that is the subject of the resource, as well as the third-party content that may or may not be related to the subject matter of the resource.

SUMMARY

One implementation relates to a method of serving content items in content item slots. The method includes receiving data indicative of a resource and a referral query. The resource includes a first content item slot and a second content item slot. A referral query location of the resource may be determined based on the referral query and data indicative of content of the resource. An order of the first content item slot and the second content item slot may be determined based on a predictive model and the referral query location. The predictive model may be based, at least in part, on aggregate historical data of interactions with the resource, and the first content item slot may be before the second content item slot in the order. Data to effect display of a first content item to be displayed in the first content item slot and data to effect display of a second content item to be displayed in the second content item slot may be transmitted. The first content item may be associated with a first value and the second content item may be associated with a second value with the first value being greater than the second value.

Another implementation relates to a system for serving content items in content item slots. The system includes one or more processing modules and one or more storage devices storing instructions that, when executed by the one or more processing modules, cause the one or more processing modules to perform several operations. The operations include receiving data indicative of a resource and a referral query. The resource may include a set of content item slots with each content item slot of the set of content item slots being associated with a corresponding location in the resource. The operations also include determining a referral query location of the resource based on the referral query and data indicative of content of the resource. The operations further include determining a content item slot order for the set of content item slots based, at least in part, on a corresponding proximity of the corresponding location of each content item slot of the set of content item slots to the referral query location. The operations still further include serving, to a client device, data to effect display of a first content item. The first content item may be associated with a first content item slot based on the content item slot order and the first content item may be selected based, at least in part, on a value from a content item auction.

Yet another implementation relates to a computer readable storage device storing instructions that, when executed by one or more processing modules, cause the one or more processing modules to perform several operations. The operations include receiving data indicative of a resource and a referral query. The resource may include a first content item slot at a first location and a second content item slot at a second location. The operations also include determining a referral query location of the resource based on the referral query and data indicative of content of the resource. The operations further include determining a first proximity of the first location relative to the referral query location and determining a second proximity of the second location relative to the referral query location. The first proximity may be less than the second proximity. The operations still further include receiving a first content item and a second content item. The operations also include serving, to a client device, data to effect display of the first content item and data to effect display of the second content item. The first content item may be associated with the first content item slot based, at least in part, on the determined first proximity, and the second content item may be associated with the second content item slot based, at least in part, on the determined second proximity.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
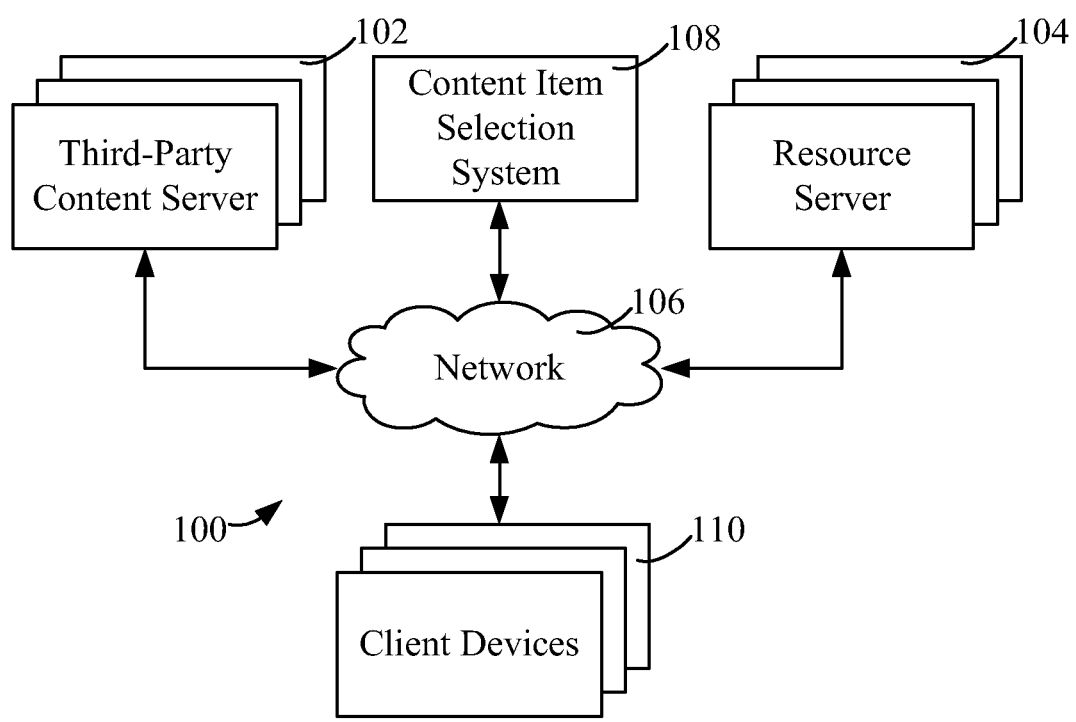
FIG. 1 is a block diagram depicting an implementation of a system for providing information via a network.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways, as the described concepts are not limited to any particular manner of implementation. Examples of specific implementations and applications are provided primarily for illustrative purposes.

A computing device (e.g., a client device) can view a resource, such as a web page, via the Internet by communicating with a server, such as a web page server, corresponding to that resource. The resource includes first-party content that is the subject of the resource from a first-party content provider, as well as additional third-party provided content, such as advertisements or other content. In one implementation, responsive to receiving a request to access a web page, a web page server and/or a client device can communicate with a data processing system, such as a content item selection system, to request a content item to be presented with the requested web page. The content item selection system can select a third-party content item and provide data to effect presentation of the content item with the requested web page on a display of the client device. In some instances, the content item is selected and served with a resource associated with a search query. For example, a search engine may return search results on a search results web page and may include third-party content items related to the search query in one or more content item slots of the search results web page.

In some instances, a device identifier is associated with the client device. The device identifier may include a randomized number associated with the client device to identify the device during subsequent requests for resources and/or content items. In some instances, the device identifier is configured to store and/or cause the client device to transmit information related to the client device to the content item selection system and/or resource server (e.g., a web browser type, an operating system, prior resource requests, prior content item requests, etc.).

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A third-party content provider, when providing third-party content items for presentation with requested resources via the Internet or other network, may utilize a content item management service to control or otherwise influence the selection and serving of the third-party content items. For instance, a third-party content provider may specify selection criteria (such as keywords) and corresponding bid values that are used in the selection of the third-party content items. The bid values may be utilized by the content item selection system in an auction to select and serve content items for display with a resource. For example, a third-party content provider may place a bid in the auction that corresponds to an agreement to pay a certain amount of money if a user interacts with the provider's content item (e.g., the provider agrees to pay $3 if a user clicks on the provider's content item). In other implementations, a third-party content provider may place a bid in the auction that corresponds to an agreement to pay a certain amount of money if the content item is selected and served (e.g., the provider agrees to pay $0.005 each time a content item is selected and served). In some instances, the content item selection system uses content item interaction data to determine the performance of the third-party content provider's content items. For example, users may be more inclined to click on third-party content items on certain web pages over others. Accordingly, auction bids to place the third-party content items may be higher for high-performing web pages, categories of web pages, and/or other criteria, while the bids may be lower for low-performing web pages, categories of web pages, and/or other criteria.

In some instances, a web page or other resource (such as, for example, an application) includes one or more content item slots in which a selected and served third-party content item may be displayed. The code (e.g., JavaScript®, HTML, etc.) defining a content item slot for a web page or other resource may include instructions to request a third-party content item from the content item selection system to be displayed with the web page.

In some instances, a resource, such as a first-party content page, may be selected to be displayed from a search results page. A user of a client device may use an input device to select a hyperlink associated with the desired resource. The hyperlinks displayed on the search result page are determined based on a search query input by the user into an interface of a search engine. Accordingly, the resource contains content, such as first-party content, that, based on a search algorithm, is relevant to the search query. The hyperlinks may also be displayed on the search result page with portions of the content of the resource associated with the hyperlink displayed. Thus, the selection of the hyperlink may be based, at least in part, on the portions of the content displayed on the search result page.

When the hyperlink is selected, the context of the search query may be lost (e.g., the selection of the hyperlink to access the resource does not include the context for why the resource was relevant). In other implementations, the search query may be used as a referral query (e.g., the query that resulted in a user of the client device selecting the hyperlink). In some implementations, the referral query is used, at least in part, in the selection of third-party content items to be displayed with the resource. In some instances, it may be useful to determine a referral query location of the resource. That is, the portion of the content of the resource that is most relevant to the referral query.

For complex search queries, such as long-tail queries, a user of a client device may be searching for some specific information. For example, such a long-tail query may be "When and where was Albert Einstein born?" Such a search query may return several resources containing content related to Albert Einstein, but the user is specifically interested in the information of the date and location of his birth. When the user of the client device selects (e.g., clicks) on a displayed search result hyperlink, the user will most likely scroll, using an input device, to the specific portion of the resource where the information most responsive to the query is located. If the search query is very specific, then the information may be located deep within the content of the resource and not necessarily near the top of the resource. Accordingly, it may be useful to determine an order for the content item slots of a resource such that the highest bidding, most relevant, and/or highest scored content items are displayed in content item slots such that the user of the client device will view the content items.

In some implementations, the referral query location of the resource may be used to determine an order for content item slots of the resource. For example, a content item slot that is near in proximity to the referral query location may have a high rank in the order while a content item slot that is far in proximity to the referral location may have a low rank in the order. In addition to the ordering based on proximity, in some implementations a predictive model may be used to modify the order based on aggregated historical data for interactions with the resource. For example, users interacting with the resource with similar referral query locations may tend to scroll to the location of the referral query location and proceed to scroll downward while rarely scrolling upward. Accordingly, a content item slot that is located further in proximity from the referral query location, but downward from the referral query location may have an increased rank based on the output of the predictive model compared to a content item slot that is located nearer in proximity to the referral query location, but upward from the referral query location.

A content item selection system may utilize the determined order for the content item slots to select and serve content items to be displayed with the resource. In one implementation, the content item selection system may select content items based on bid values and the determined order. In other implementations, the content item selection system may select content items based the determined order and other values, such as predicted click-through-rate (pCTR), predicted conversion rate (pCVR), etc. Display data for the selected content items may be transmitted to a client device to be displayed in the content item slots.

In some implementations, a script may be generated and transmitted with the display data for the selected content items. The script may be configured to modify the content items presented in the content item slots of the resource. For example, the script may receive a user interaction with an input device, such as a mouse scroll, and modify which content items are displayed in which content item slots based on the received user interaction. That is, when a user scrolls upward relative to a referral query location, the script may cause the a content item to be displayed in a content item slot that is located upward relative to the referral query location.

While the foregoing has provided an overview of a content item selection system that determines an order for content item slots based on a predictive model, more specific implementations and systems for such a system will now be described.

FIG. 1 is a block diagram of an implementation of a system 100 for providing information via at least one computer network such as the network 106. The network 106 may include a local area network (LAN), wide area network (WAN), a telephone network, such as the Public Switched Telephone Network (PSTN), a wireless link, an intranet, the Internet, or combinations thereof. The system 100 can also include at least one data processing system or processing module, such as a content item selection system 108. The content item selection system 108 can include at least one logic device, such as a computing device having a data processor, to communicate via the network 106, for example with a resource server 104, a client device 110, and/or a third-party content server 102. The content item selection system 108 can include one or more data processors, such as a content placement processor, configured to execute instructions stored in a memory device to perform one or more operations described herein. In other words, the one or more data processors and the memory device of the content item selection system 108 may form a processing module. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EE-PROM), erasable programmable read only memory (EPROM), flash memory, optical media, or any other suitable memory from which processor can read instructions. The instructions may include code from any suitable computer programming language such as, but not limited to, ActionScript®, C, C++, C #, HTML, Java®, JavaScript®, Perl®, Python®, Visual Basic®, and XML. The processing module may process instructions and output data to effect presentation of one or more content items to the resource server 104 and/or the client device 110. In addition to the processing circuit, the content item selection system 108 may include one or more databases configured to store data. The content item selection system 108 may also include an interface configured to receive data via the network 106 and to provide data from the content item selection system 108 to any of the other devices on the network 106. The content item selection system 108 can include a server, such as an advertisement server or otherwise.

The client device 110 can include one or more devices such as a computer, laptop, desktop, smart phone, tablet, personal digital assistant, set-top box for a television set, a smart television, or server device configured to communicate with other devices via the network 106. The device may be any form of portable electronic device that includes a data processor and a memory, i.e., a processing module. The memory may store machine instructions that, when executed by a processor, cause the processor to perform one or more of the operations described herein. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C #, HTML, Java®, JavaScript®, Perl®, Python®, Visual Basic®, and XML.

The client device 110 can execute a software application (e.g., a web browser or other application) to retrieve content from other computing devices over network 106. Such an application may be configured to retrieve first-party content from a resource server 104. In some cases, an application running on the client device 110 may itself be first-party content (e.g., a game, a media player, etc.). In one implementation, the client device 110 may execute a web browser application which provides a browser window on a display of the client device. The web browser application that provides the browser window may operate by receiving input of a uniform resource locator (URL), such as a web address, from an input device (e.g., a pointing device, a keyboard, a touch screen, or another form of input device). In response, one or more processors of the client device executing the instructions from the web browser application may request data from another device connected to the network 106 referred to by the URL address (e.g., a resource server 104). The other device may then provide web page data and/or other data to the client device 110, which causes visual indicia to be displayed by the display of the client device 110. Accordingly, the browser window displays the retrieved first-party content, such as web pages from various websites, to facilitate user interaction with the first party content.

The resource server 104 can include a computing device, such as a server, configured to host a resource, such as a web page or other resource (e.g., articles, comment threads, music, video, graphics, search results, information feeds, etc.). The resource server 104 may be a computer server (e.g., a file transfer protocol (FTP) server, file sharing server, web server, etc.) or a combination of servers (e.g., a data center, a cloud computing platform, etc.). The resource server 104 can provide resource data or other content (e.g., text documents, PDF files, and other forms of electronic documents) to the client device 110. In one implementation, the client device 110 can access the resource server 104 via the network 106 to request data to effect presentation of a resource of the resource server 104.

One or more third-party content providers may have third-party content servers 102 to directly or indirectly provide data for third-party content items to the content item selection system 108 and/or to other computing devices via network 106. The content items may be in any format that may be presented on a display of a client device 110, for example, graphical, text, image, audio, video, etc. The content items may also be a combination (hybrid) of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc. In some instances, the third-party content servers 102 may be integrated into the content item selection system 108 and/or the data for the third-party content items may be stored in a database of the content item selection system 108.

In one implementation, the content item selection system 108 can receive, via the network 106, a request for a content item to present with a resource. The received request may be received from a resource server 104, a client device 110, and/or any other computing device. The resource server 104 may be owned or ran by a first-party content provider that may include instructions for the content item selection system 108 to provide third-party content items with one or more resources of the first-party content provider on the resource server 104. In one implementation, the resource may include a web page. The client device 110 may be a computing device operated by a user (represented by a device identifier), which, when accessing a resource of the resource server 104, can make a request to the content item selection system 108 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, a referral query, etc.). The information that the content item selection system 108 receives can include a HyperText Transfer Protocol (HTTP) cookie which contains a device identifier (e.g., a random number) that represents the client device 110. In some implementations, the device information and/or the resource information may be appended to a content item request URL (e.g., http://contentitem.item/page/contentitem?devid=abc123&devnfo=A34r0). In some implementations, the device information and/or the resource information may be encoded prior to being appended the content item request URL. The requesting device information and/or the resource information may be utilized by the content item selection system 108 to select third-party content items to be served with the requested resource and presented on a display of a client device 110.

In some instances, a resource of a resource server 104 may include a search engine feature. The search engine feature may receive a search query (e.g., a string of text) via an input feature (an input text box, etc.). The search engine may search an index of documents (e.g., other resources, such as web pages, etc.) for relevant search results based on the search query. The search results may be transmitted as a second resource to present the relevant search results, such as a search result web page, on a display of a client device 110. The search results may include web page titles, hyperlinks, etc. One or more third-party content items may also be presented with the search results in a content item slot of the search result web page. Accordingly, the resource server 104 and/or the client device 110 may request one or more content items from the content item selection system 108 to be presented in the content item slot of the search result web page. The content item request may include additional information, such as the client device information, the resource information, a quantity of content items, a format for the content items, the search query string, keywords of the search query string, information related to the query (e.g., geographic location information and/or temporal information), etc. In some implementations, a delineation may be made between the search results and the third-party content items to avert confusion.

In some implementations, the third-party content provider may manage the selection and serving of content items by content item selection system 108. For example, the third-party content provider may set bid values and/or selection criteria via a user interface that may include one or more content item conditions or constraints regarding the serving of content items. A third-party content provider may specify that a content item and/or a set of content items should be selected and served for client devices 110 having device identifiers associated with a certain geographic location or region, a certain language, a certain operating system, a certain web browser, etc. In another implementation, the third-party content provider may specify that a content item or set of content items should be selected and served when the resource, such as a web page, document, etc., contains content that matches or is related to certain keywords, phrases, etc. The third-party content provider may set a single bid value for several content items, set bid values for subsets of content items, and/or set bid values for each content item. The third-party content provider may also set the types of bid values, such as bids based on whether a user clicks on the third-party content item, whether a user performs a specific action based on the presentation of the third-party content item, whether the third-party content item is selected and served, and/or other types of bids.

Figure 2:
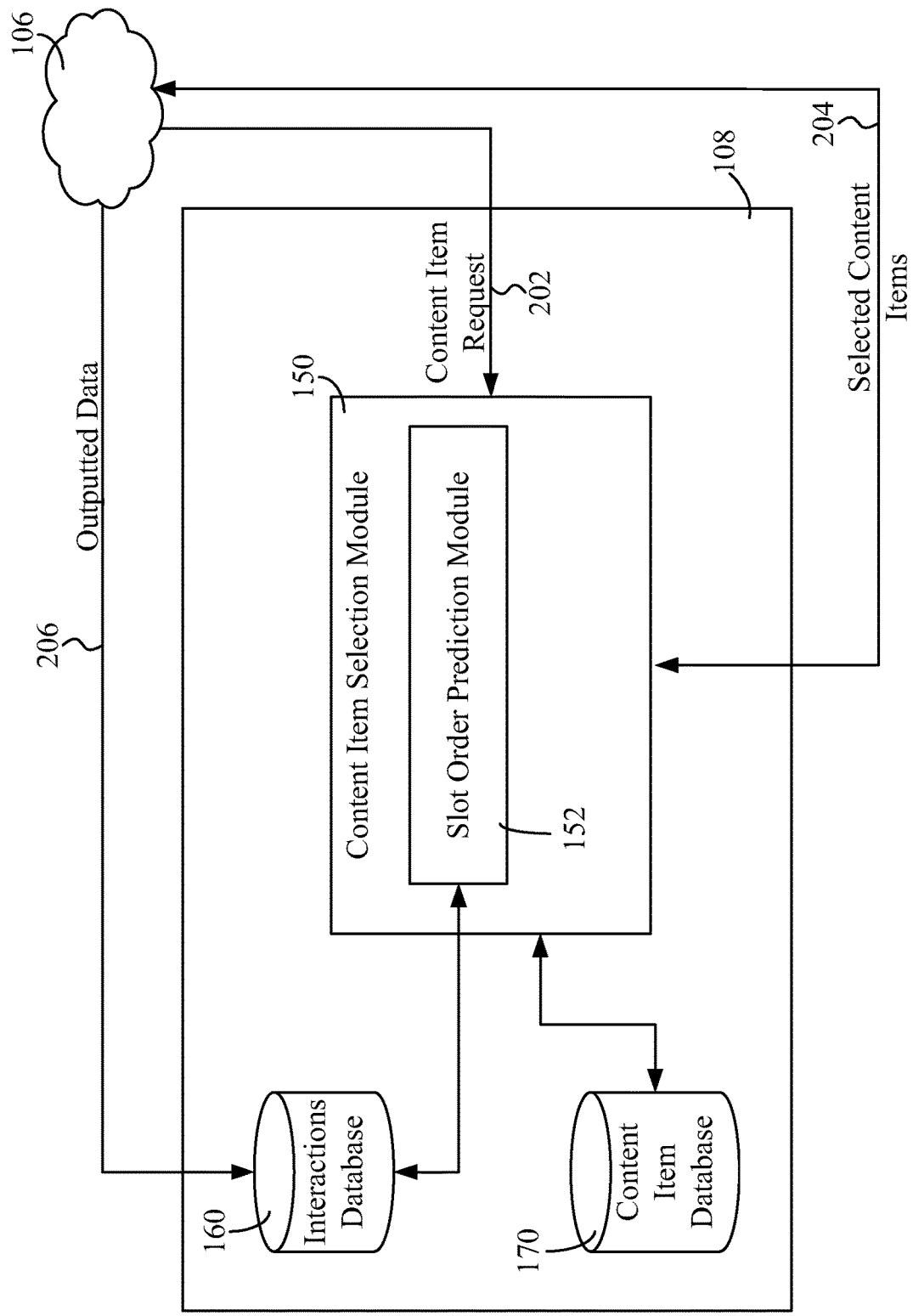
FIG. 2 is block diagram depicting an implementation of a content item selection system.

Referring now to FIG. 2, portions of the content item selection system 108 are shown in more detail. In the implementation depicted in FIG. 2, the content item selection system 108 includes a content item selection module 150, an interactions database 160, and a content item database 170. The content item selection module 150 includes a slot order prediction module 152. While the implementation shown in FIG. 2 depicts the interactions database 160 and the content item database 170 as separate databases, it should be understood that the databases may be combined into a single database or sets of databases.

The content item selection module 150 is configured to receive a content item request 202 via the network 106. A client device, such as client device 110 of FIG. 1, or a resource server, such as resource server 104, may send the content item request 202 to the content item selection system 108 via the network 106. The content item request 202 may include one or more characteristics of the client device (e.g., a type of client device, a display type of a client device, dimensions of the display), characteristics of a web browser executed on the client device (e.g., a type of web browser), settings associated with the client device (e.g., a display resolution), settings associated with the web browser executed on the client device (e.g., a height of a web browser window, a width of a web browser window, a text size setting of the web browser of the client device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser, formulae derived from dimensions of a web browser window and/or location of an area where a content item may be shown), a referral query, and/or characteristics of the resource with which the content item is to be presented (e.g., a position of one or more content item slots in the resource, a category of the resource, a type of the resource, an interactivity level of the resource, a ranking of the resource, a popularity of the resource, part or all of an address of the resource). In some implementations, the foregoing data may be appended to or included in a content item request URL (e.g., http://contentitem.item/page/contentitem?devid=abc123&devnfo=A34r0).

In one implementation, the content item request 202 includes a referral query and data indicative of the resource, including data indicative of the content of the resource and positional data indicative of the positions of one or more content item slots relative to the content of the resource. The data included with the content item request 202 may be received by the slot order prediction module 152 and used with a predictive model to output a content item slot order based, at least in part, on the referral query and the data indicative of the content of the resource, as will be described in greater detail below.

The slot order prediction module 152 is configured to use a predictive model to output an order for one or more content item slots of a resource. In one implementation, the slot order prediction module 152 may utilize aggregate historical data of interactions with the resource from an interactions database 160 to generate the predictive model. The aggregate historical data of interactions may include data indicative of whether the one or more content item slots of the resource was viewed, data indicative of a direction of scrolling relative to the one or more content item slots, data indicative of one or more referral search queries, data indicative of a viewable area of the resource associated with a referral query location, data indicative of aggregate demographic information of groups relative to the resource, data indicative of lengths of time spent viewing one or more portions of the resource, data indicative of one or more characteristics of client devices (e.g., a type of client device, a display type of a client device, dimensions of the display), data indicative of one or more characteristics of a web browser executed on client devices (e.g., a type of web browser), data indicative of one or more settings associated with client devices (e.g., a display resolution), data indicative of one or more settings associated with the web browser executed on client devices (e.g., a height of a web browser window, a width of a web browser window, a text size setting of the web browser of the client device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser, formulae derived from dimensions of a web browser window and/or location of an area where a content item may be shown), and/or data indicative of one or more characteristics of the resource (e.g., a position of one or more content item slots in the resource, a category of the resource, a type of the resource, an interactivity level of the resource, a ranking of the resource, a popularity of the resource, part or all of an address of the resource).

The slot order prediction module 152 may generate the predictive model using a machine learning algorithm, such as a regression learning algorithm. Examples of such regression learning algorithms include perceptron linear learning, maximum entropy logistic regression, support vector machine (SVM) regression with maximum entropy gradient, descent least-squares stochastic gradient, etc.

In some implementations, the predictive model may be previously generated, either by the slot order prediction module 152 and/or by another module or system, and the slot order prediction module 152 may request and receive the predictive model from a database in which the predictive model is stored, such as the interactions database 160 or another database.

In some further implementations, if an order has been previously generated for the same or a substantially similar referral query and stored in a database, such as the interactions database 160 or another database, the slot order prediction module 152 may retrieve the order from the database.

The slot order prediction module 152 of the present implementation receives the data indicative of the resource, including data indicative of the content of the resource, and the referral query. The slot order prediction module 152 is configured to determine a referral query location using the data indicative of the resource and the referral query. Using the previous example, if the referral query (i.e., the search query that resulted in the user of the client device selecting the hyperlink for the resource) is "When and where was Albert Einstein born?," then the slot order prediction module 152 may parse through the data indicative of the content of the resource to determine a referral query location that is responsive to the referral query. That is, based on the query presented of "When and where was Albert Einstein born?," the slot order prediction module 152 determines the location in the content of the resource (e.g., the text having the location and date of birth) that is responsive to the query. The slot order prediction module 152 is configured to determine an order for the one or more content item slots of the resource based on the predictive model and the referral query location. In some implementations, the slot order prediction module 152 may also receive data associated with the client device. The data associated with the client device may be included in the content item request 202. The data may be used by the slot order prediction module 152 as an input into the predictive model in addition to the referral query location and/or other input data.

The determined order may be used by the content item selection module 150 for the order of content item slots for an auction of third-party content items. Data for the third-party content items may be stored in a content item database 170 and/or may be stored in another storage device of the content item selection system 108 and/or in another system, such as a third-party content server 102 of FIG. 1.

A first auction may be conducted for the first content item slot based on the order, a second auction may be conducted for the second content item slot based on the order, etc. In other implementations, the content item selection module 150 may perform a single auction for the one or more content item slots of the resource and may select the winning third-party content item in the first content item slot based on the order, the second place third-party content item in the second content item slot based on the order, etc. In still other implementations, the content item selection module 150 may rank several content items based on the auction. A number of content items may be selected based on the rank and the number of content item slots of the resource (e.g., if the resource has three content item slots, then the top three content items based on the ranking may be selected). The selected content items may be allocated to corresponding content item slots by the content item selection module 150. Using the previous example, if three content items are selected, a first content item having the highest bid may be selected for a first content item slot based on the order, a second content item having the second highest bid may be selected for a second content item slot based on the order, etc. In another implementation, a first content item having the highest score may be selected for a first content item slot based on the order, a second content item having the second highest score may be selected for a second content item slot based on the order, etc. In still another implementation, a first content item having the highest relevance may be selected for a first content item slot based on the order, a second content item having the second highest relevance may be selected for a second content item slot based on the order, etc. In yet other implementations, values such as a pCTR value or a pCVR value may be used to select the first content item for the first content item slot based on the order, the second content item for the second content item slot based on the order, etc.

In some implementations, several referral query locations may be determined that are relevant to the referral query. In such instances, the slot order prediction module 152 may determine a set of referral query locations. In some implementations, the set of referral query locations may be ranked based upon relevance. Accordingly, when several referral query locations are utilized with a predictive model, the order may be generated based on the set of referral query locations.

Data to effect the display of the selected content items 204 may be transmitted or served by the content item selection module 150 to the client device and/or the resource server via the network 106. The data to effect display of the selected content items 204 may include data indicative of the content item slot in which the content item is to be displayed.

In some implementations, a script may be generated by the content item selection system 108. The script may be a JavaScript® script having one or more functions executable by a processing module of the client device on which the selected and served content items are to be displayed. In one example implementation, the script may include a function that receives data indicative of a direction of scrolling relative to the content of the resource. The data indicative of the direction of scrolling may be used to modify which content items are presented in which content item slots. That is, in one example implementation, the script may receive data indicative of the direction of scrolling and may modify the order and/or the presentation of the content items based on the direction of scrolling. For example, a resource may have three content item slots, slot one, slot two, and slot three, with slot one located at a top portion of the resource, slot two located at a midpoint portion of the resource, and slot three located at a bottom portion of the resource. An order determined by the slot order prediction module 152 may order the set of slots in an order of slot two, slot three, slot one. If, for example, data indicative of a direction of scrolling indicates an upward scroll, a content item that may originally be presented in slot three may be swapped with the content item originally to be presented in slot one, thereby resulting in a second-ranked content item being shown in slot one based on the user interaction. In some implementations, the script may include a delay until the referral query location is displayed within a viewable area of the resource (e.g., the referral query location upon which the order of content item slots is based, at least in part, is displayed on a display of the client device). Thus, the script may dynamically modify the presentation of content items in content items slots based, at least in part, on user interactions, such as data indicative of a direction of scrolling.

In some implementations, data may be output 206 from the client device to the content item selection system 108. For example, the outputted data 206 may include data indicative of whether the one or more content item slots of the resource was viewed, data indicative of a direction of scrolling relative to the one or more content item slots, data indicative of one or more referral search queries, data indicative of a viewable area of the resource associated with a referral query location, data indicative of lengths of time spent viewing one or more portions of the resource, data indicative of one or more characteristics of client devices (e.g., a type of client device, a display type of a client device, dimensions of the display), data indicative of one or more characteristics of a web browser executed on client devices (e.g., a type of web browser), data indicative of one or more settings associated with client devices (e.g., a display resolution), data indicative of one or more settings associated with the web browser executed on client devices (e.g., a height of a web browser window, a width of a web browser window, a text size setting of the web browser of the client device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser, formulae derived from dimensions of a web browser window and/or location of an area where a content item may be shown), and/or data indicative of one or more characteristics of the resource (e.g., a position of one or more content item slots in the resource, a category of the resource, a type of the resource, an interactivity level of the resource, a ranking of the resource, a popularity of the resource, part or all of an address of the resource).

In some implementations, the outputted data 206 may be transmitted from the client device at the end of a page session (i.e., when a client device navigates away from the resource, when the web browser is closed, etc.). The outputted data 206 may be stored in the interactions database 160 such that the predictive model may be updated using the additional historical interaction data. Thus, the slot order prediction module 152 may further refine the outputted order for the content item slots based on the updated historical interaction data.

Figure 3:
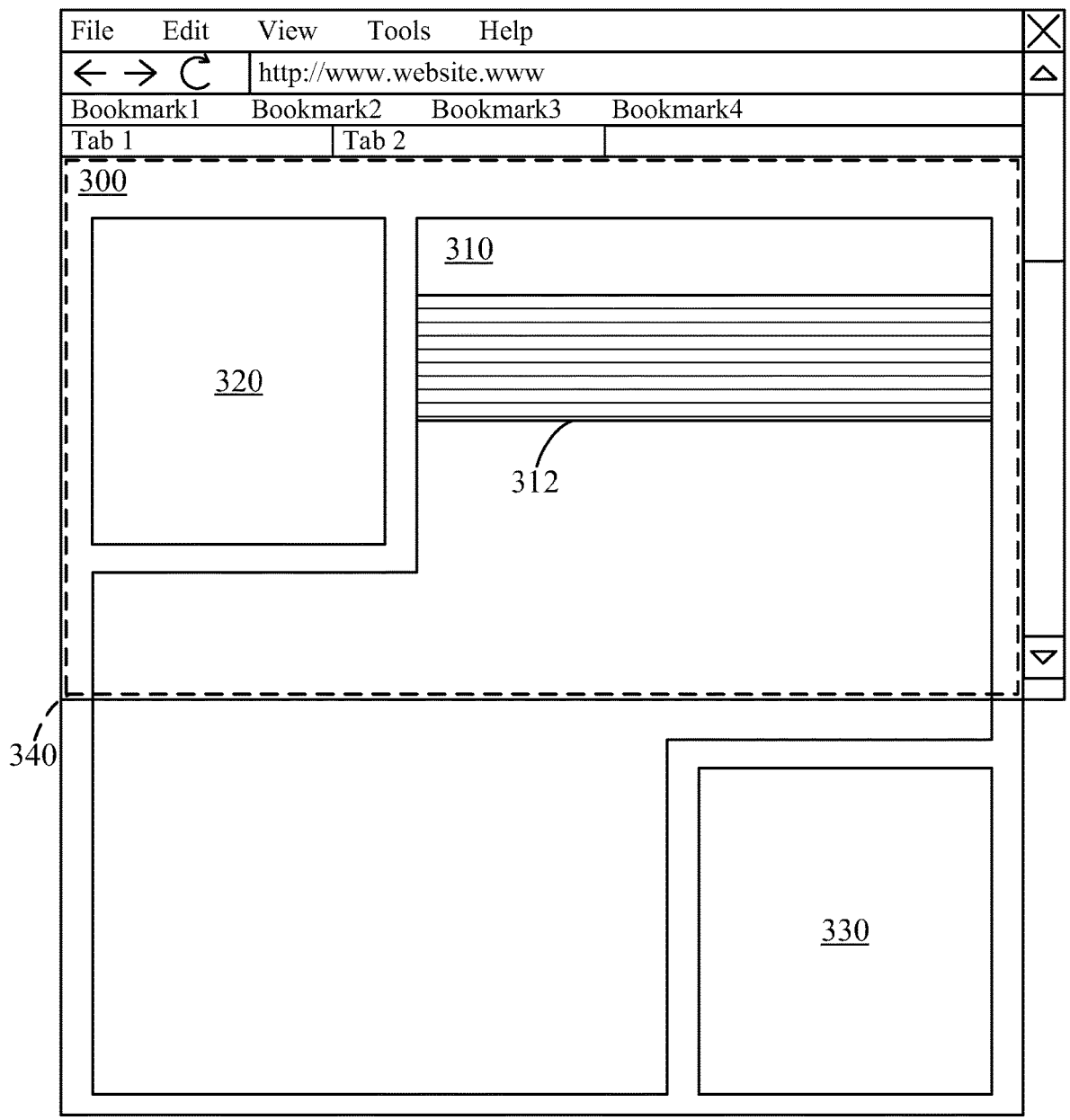
FIG. 3 is an overview depicting an implementation of a resource having several content item slots, first-party content, and a referral query location.

FIG. 3 depicts an implementation of a resource 300 having content 310, such as first-party content, and two content item slots 320, 330, in which third-party content items may be served and displayed to a user of a client device viewing the resource 300 using a web browser. The content 310 includes a referral query location 312 that includes content relevant to the referral query that resulted in the resource 300 being selected by a user of a client device displaying the resource 300. The referral query location 312 may include textual content, visual content (e.g., images or videos), or other content that is relevant based on the referral query. As discussed above, the referral query location 312 may be determined by the slot order prediction module 152 of the content item selection system 108.

The referral query location 312 is used by the slot order prediction module 152 to determine an order of the content item slots 320, 330. In one example, the order may be determined based on the output of a predictive model based on aggregate historical data of interactions with the resource 300 and the referral query location 312. In some implementations, the order may be based, at least in part, on a proximity of a location of a content item slot 320, 330 relative to the referral query location 312. For example, the order may result in the content item slot 320 being first and the content item slot 330 being second in the order. In some implementations, the proximity of the content item slots 320, 330 may be included in the determination of the order by the predictive model.

In some implementations, a viewable area 340 of the resource 300 associated with the referral query location 312 may be utilized in determining the order of content item slots 320, 330. In the implementation shown, the viewable area 340 depicts content item slot 320 as viewable when the relevant content located at the referral query location 312 is on screen. Based on the viewable area 340 and the position of the referral query location 312, content item slot 330 may be less likely to be visible in the viewable area 340 while the relevant content of the referral query location 312 is on screen. Accordingly, the viewable area 340 relative to the referral query location 312 may be used by the slot order prediction module 152 as an input for the predictive model in some implementations.

Figure 4:
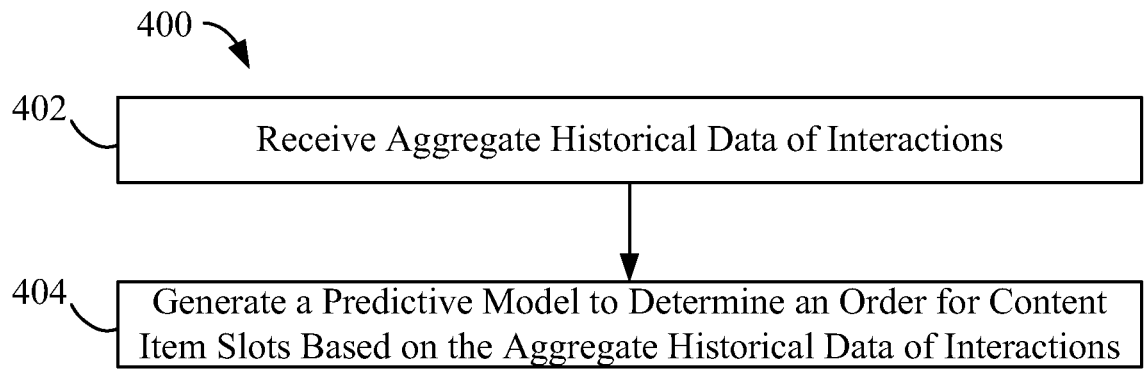
FIG. 4 is a flow diagram of an implementation of a process for generating a predictive model based on aggregate historical data of interactions.

FIG. 4 depicts an implementation of a process 400 that may be used by the slot order prediction module 152 to generate a predictive model based on aggregate historical data of interactions. The process 400 includes receiving aggregate historical data of interactions (block 402). The aggregate historical data of interactions may be received by the slot order prediction module 152 of the content item selection system 108 from an interactions database 160.

The aggregate historical data of interactions may include data indicative of whether the one or more content item slots of the resource was viewed, data indicative of a direction of scrolling relative to the one or more content item slots, data indicative of one or more referral search queries, data indicative of a viewable area of the resource associated with a referral query location, data indicative of aggregate demographic information of groups relative to the resource, data indicative of lengths of time spent viewing one or more portions of the resource, data indicative of one or more characteristics of client devices (e.g., a type of client device, a display type of a client device, dimensions of the display), data indicative of one or more characteristics of a web browser executed on client devices (e.g., a type of web browser), data indicative of one or more settings associated with client devices (e.g., a display resolution), data indicative of one or more settings associated with the web browser executed on client devices (e.g., a height of a web browser window, a width of a web browser window, a text size setting of the web browser of the client device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser, formulae derived from dimensions of a web browser window and/or location of an area where a content item may be shown), and/or data indicative of one or more characteristics of the resource (e.g., a position of one or more content item slots in the resource, a category of the resource, a type of the resource, an interactivity level of the resource, a ranking of the resource, a popularity of the resource, part or all of an address of the resource).

A predictive model to determine an order of content item slots is generated based on the aggregate historical data of interactions (block 404). In some implementations, a predictive model may be generated for each resource. In other implementations, a predictive model may be generated for each resource for each referral query. In still other implementations, a predictive model may be generated for each resource for each group profile based on aggregate demographic information. In another implementation, the predictive models may be generated for each referral query for each resource and for each group profile based on aggregate demographic information.

In some implementations, the generated predictive model or models may be stored in a database, such as the interactions database 160, such that the predictive model or models may be used by the slot order prediction module 152 in response to the same or a substantially similar content item request and/or referral query. In some implementations, each predictive model may include a unique identifier. In some implementations, the process 400 may receive additional aggregate historical data of interactions (block 402) and may update the predictive model or regenerate the predictive model (block 404) base on the additional aggregate historical data of interactions.

Figure 5:
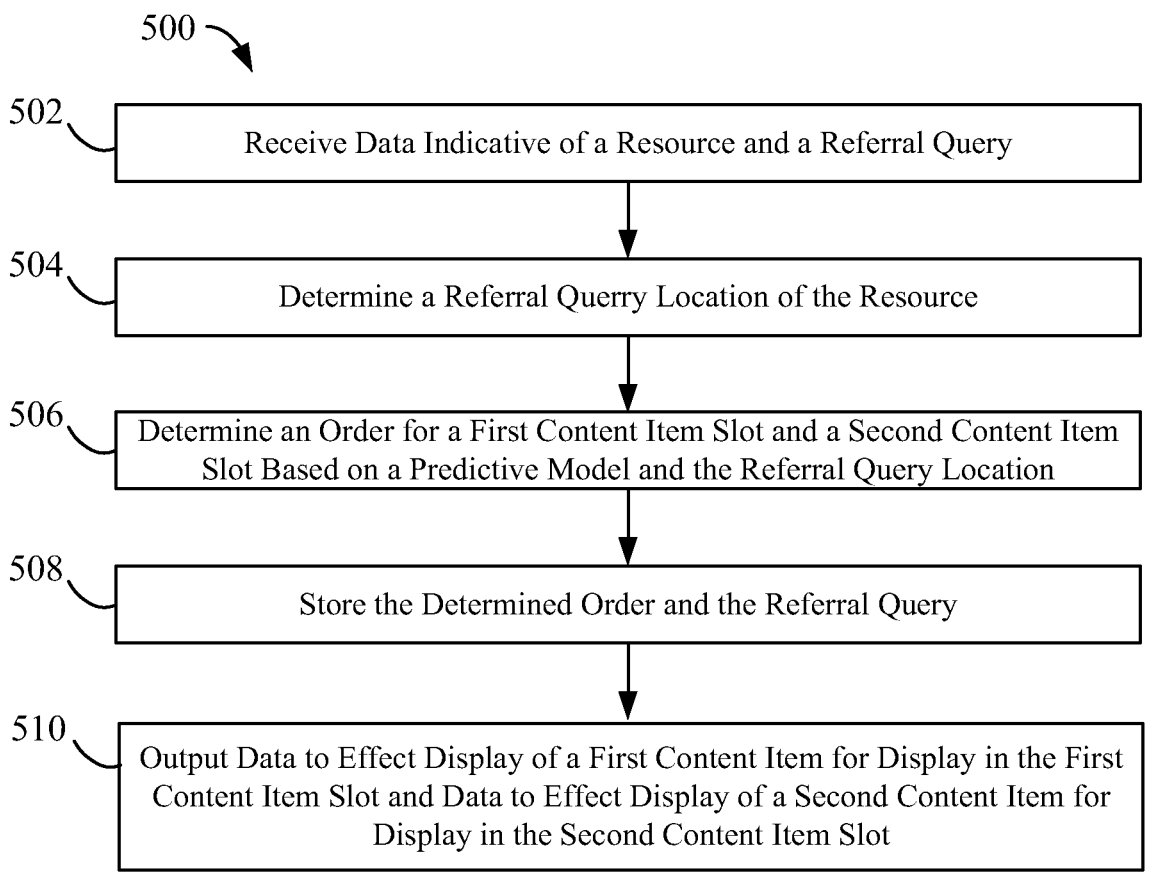
FIG. 5 is a flow diagram of an implementation of a process for determining an order for content item slots based on a predictive model and a referral query location and serving selected content items in the content item slots based on the determined order.

FIG. 5 depicts an implementation of a process 500 for determining an order for content item slots and outputting data to effect display of content items in the content item slots based on the order. The process 500 includes receiving data indicative of a resource and a referral query (block 502). The data indicative of the resource may include data indicative of the content of the resource and data indicative of the positions of one or more content item slots relative to the content of the resource. The data indicative of the resource may include code for the resource, such as HTML code. The resource may include one or more content item slots. In some implementations, the resource may include a first content item slot and a second content item slot. In other implementations, the resource may have a set of content item slots.

The data indicative of the referral query may include one or more search terms used in a search query that the resource was selected as responsive to. Using the above example, a search query for "When and where was Albert Einstein born?" may be parsed into search terms of "When," "and," "where," "was," "Albert," "Einstein," and "born." In some implementations, stop words (e.g., words such as "a," "and," "or" etc.) may be removed from the search query terms. In some implementations, the search query may be configured to recognize formal or other special search terms, such as state names, country names, famous names, etc. such that, in the present example, a search term for "Albert Einstein" may be preserved as a single search term. The data indicative of the resource and the referral query may be received by the slot order prediction module 152 of the content item selection system 108, in some implementations.

A referral query location of the resource is determined (block 504). In some implementations, the slot order prediction module 152 may determine the referral query location of the resource. In other implementations, other modules of the content item selection system 108 may determine the referral query location. The referral query location is determined based on the referral query and data indicative of the content of the resource. That is, one or more terms of the referral query may be compared to the data indicative of the content of the resource. In some implementations, a single referral query location may be determined based on the best match of the content of the resource to the terms of the referral query. In other implementations, several referral query locations may be determined. For example, if the referral query (i.e., the search query that resulted in the user of the client device selecting the hyperlink for the resource) is "When and where was Albert Einstein born?," then the slot order prediction module 152 may parse through the data indicative of the content of the resource to determine a referral query location that is responsive to the referral query. That is, based on the query presented of "When and where was Albert Einstein born?," the slot order prediction module 152 determines the location in the content of the resource (e.g., the text having the location and date of birth) that is responsive to the query.

An order for a first content item slot and a second content item slot is determined based on a predictive model and the referral query location (block 506). The referral query location and the location of the first content item slot may be used as inputs to the predictive model. The predictive model may output a value, such as a score, based on the referral query location and the location of the first content item slot. In some implementations, data associated with the client device may be input into the predictive model as well. The referral query location and the location of the second content item slot may also be used as inputs to the predictive model to output a second value, such as a score, based on the referral query location and the location of the second content item slot. In some implementations, data associated with the client device may be input into the predictive model as well.

Of course, additional data may be input into the predictive model to generate the first and second values. For example, data indicative of one or more characteristics of the client device (e.g., a type of client device, a display type of a client device, dimensions of the display), data indicative of one or more characteristics of a web browser executed on the client device (e.g., a type of web browser), data indicative of one or more settings associated with the client device (e.g., a display resolution), data indicative of one or more settings associated with the web browser executed on the client device (e.g., a height of a web browser window, a width of a web browser window, a text size setting of the web browser of the client device, a font setting of the web browser, a zoom setting of the web browser, a dimension of one or more toolbar portions of the web browser, a dimension of one or more navigation and address portions of the web browser, a dimension of one or more bookmark portions of the web browser, a dimension of one or more tab portions of the web browser, a number of tabs open in the web browser, a dimension of a scroll bar of the web browser, formulae derived from dimensions of a web browser window and/or location of an area where a content item may be shown), and/or data indicative of one or more characteristics of the resource (e.g., a position of one or more content item slots in the resource, a category of the resource, a type of the resource, an interactivity level of the resource, a ranking of the resource, a popularity of the resource, part or all of an address of the resource).

Based on the values, the first content item slot and the second content item slot may be ranked to determine the order. For example, if the first value for the first content item slot is 0.732 and the second value for the second content item slot is 0.634, then the order determined for the first content item slot and the second content item slot may be the first content item slot followed by the second content item slot. In another example with three content item slots, if the first value for the first content item slot is 0.732, the second value for the second content item slot is 0.634, and a third value for a third content item slot is 0.713, then the order determined for the content item slots may be the first content item slot followed by the third content item slot followed by the second content item slot.

In some implementations, the determined order and the referral query may be stored (block 508). The determined order and the referral query may be stored as a static content item slot order for the resource based on the referral query. The static content item slot order may be stored in a database, such as the interactions database 160 and/or another database. The static content item slot order may be associated with data indicative of the referral query such that, if the same or a similar referral query is received with a subsequent content item request for the resource, the static order may be retrieved and used by the content item selection system 108.

Data to effect display of a first content item for display in the first content item slot and data to effect display of a second content item for display in the second content item slot may be outputted (block 510). The outputted data may be transmitted from the content item selection system 108 to a client device 110 and/or resource server 104 via the network 106. In some implementations, the outputted data may include data, such as an identifier, to indicate which content item is to be shown in which content item slot.

In other implementations, the content item selection system 108 may output the data to effect display the content items based on a linear order of the content item slots. That is, for a content item-ordered set of slot two-content item one, slot three-content item two, slot one-content item three, the content item selection system 108 may output data to effect display of content item three first (to be displayed in content item slot one), data to effect display of content item one second (to be displayed in content item slot two), and data to effect display of content item two third (to be displayed in content item slot three). Thus, the client device may simply display the content items in the slots and order in which the data to effect display is received by the client device.

In some implementations, a first content item to be displayed in a first content item slot based on the determined order may be associated with a first value and a second content item to be displayed in a second content item slot based on the determined order may be associated with a second value. The first value may be greater than the second value. In one implementation, the first content item may be selected to be displayed in the first content item slot of the determined order based on the first content item having the highest bid and the second content item may be selected to be displayed in the second content item slot of the determined order based on the second content item having the second highest bid. In another implementation, the first content item may be selected to be displayed in the first content item slot of the determined order based on the first content item having the highest score and the second content item may be selected to be displayed in the second content item slot of the determined order based on the second content item having the second highest score. In still another implementation, the first content item may be selected to be displayed in the first content item slot of the determined order based on the first content item having the highest relevance and the second content item may be selected to be displayed in the second content item slot of the determined order based on the second content item having the second highest relevance. Of course, other values may be used to determine which content item is selected to be displayed in each content item slot of the order.

Figure 6:
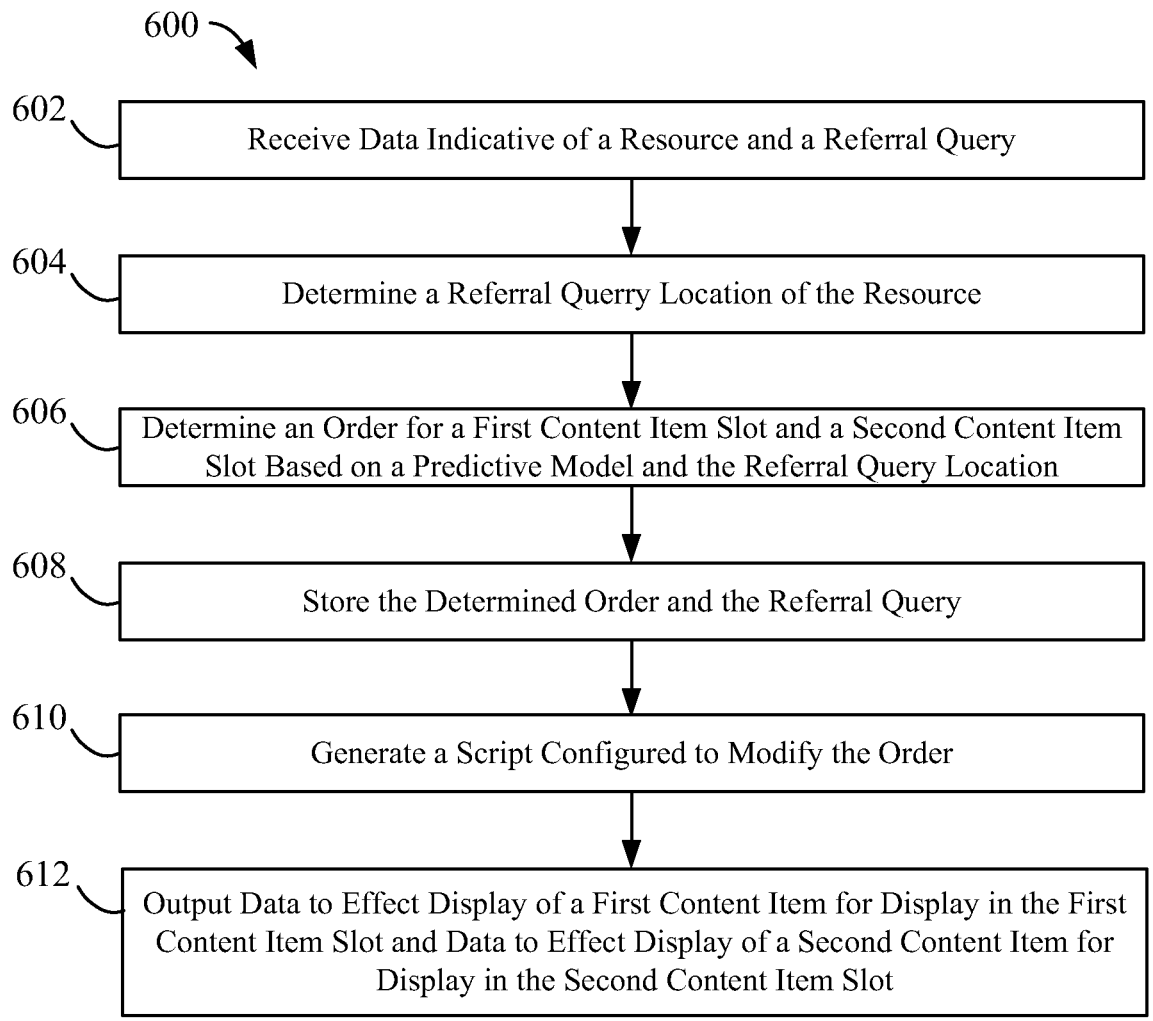
FIG. 6 is a flow diagram of an implementation of a process for determining an order for content item slots based on a predictive model and a referral query location, serving selected content items in the content item slots based on the determined order, and generating a script to modify the order.

FIG. 6 depicts another implementation of a process 600 for determining an order for content item slots and outputting data to effect display of content items in the content item slots based on the order. Blocks 602, 604, 606, 608, and 612 of process 600 may be substantially similar to those described in reference to blocks 502, 504, 506, 508, and 510 of FIG. 5, respectively.

Process 600 further includes generating a script configured to modify the order (block 610). The script may be a JavaScript® script having one or more functions executable by a processing module of a client device on which selected and served content items are to be displayed. In one example implementation, the script may include a function that receives data indicative of a direction of scrolling relative to the content of the resource. The data indicative of the direction of scrolling may be used to modify which content items are presented in which content item slots. That is, in one example implementation, the script may receive data indicative of the direction of scrolling and may modify the order and/or the presentation of the content items based on the direction of scrolling. For example, a resource may have three content item slots, slot one, slot two, and slot three, with slot one located at a top portion of the resource, slot two located at a midpoint portion of the resource, and slot three located at a bottom portion of the resource. An order determined by the slot order prediction module 152 may order the set of slots in an order of slot two, slot three, slot one. If, for example, data indicative of a direction of scrolling indicates an upward scroll, a content item that may originally be presented in slot three may be swapped with the content item originally to be presented in slot one, thereby resulting in a second-ranked content item being shown in slot one based on the user interaction. In some implementations, the script may include a delay until the referral query location is displayed within a viewable area of the resource (e.g., the referral query location upon which the order of content item slots is based, at least in part, is displayed on a display of the client device). Thus, the script may dynamically modify the presentation of content items in content items slots based, at least in part, on user interactions, such as data indicative of a direction of scrolling.

The generated script may be transmitted with the data to effect display of a first content item to be displayed in the first content item slot and data to effect display of a second content item to be displayed in the second content item slot (block 612).

Figure 7:
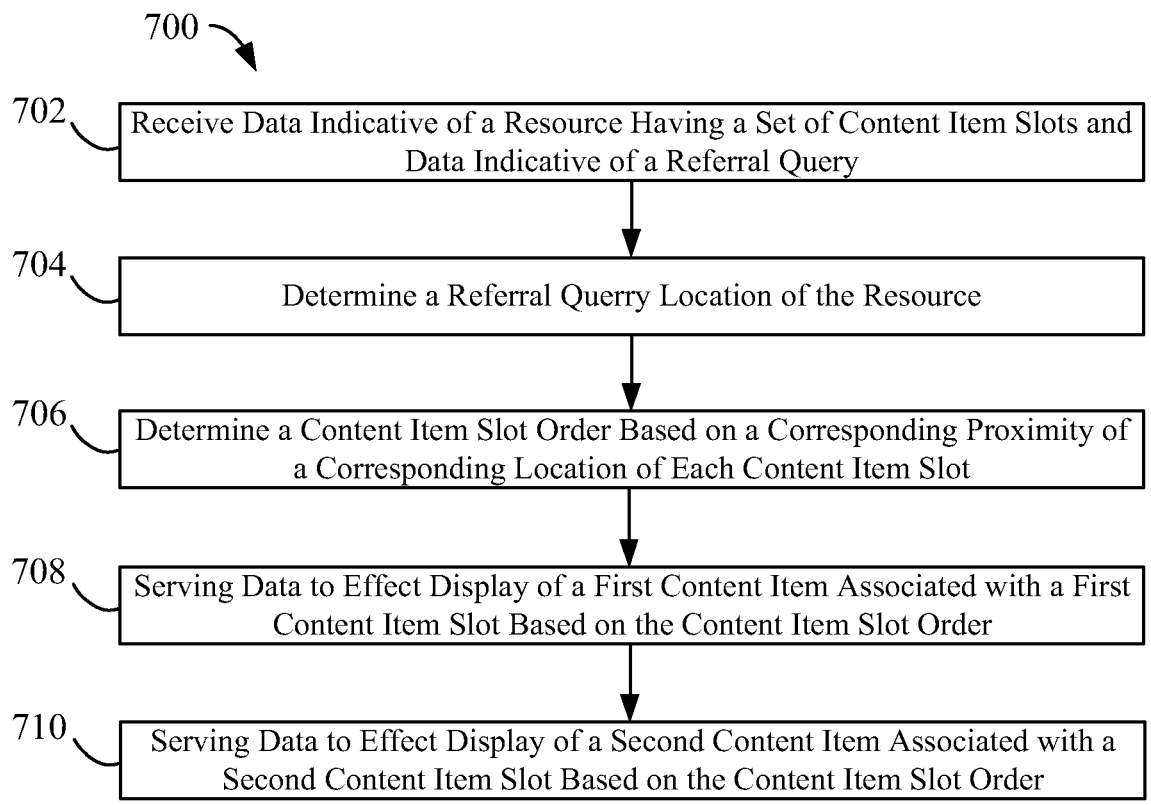
FIG. 7 is a flow diagram of an implementation of a process for determining an order for content item slots based on a proximity of the content item slot to the referral query location and serving selected content items in the content item slots based on the determined order.

FIG. 7 depicts still another implementation of a process 700 for determining an order for content item slots and outputting data to effect display of content items in the content item slots based on the order. The process 700 includes receiving data indicative of a resource having a set of content item slots and data indicative of a referral query (block 702). The data indicative of the resource may include data indicative of the content of the resource and data indicative of a position or location associated with each content item slot of the set of content item slots relative to the content of the resource. The data indicative of the resource may include code for the resource, such as HTML code.

The data indicative of the referral query may include one or more search terms used in a search query that the resource was selected as responsive to. Using the above example, a search query for "When and where was Albert Einstein born?" may be parsed into search terms of "When," "and," "where," "was," "Albert," "Einstein," and "born." In some implementations, stop words (e.g., words such as "a," "and," "or" etc.) may be removed from the search query terms. In some implementations, the search query may be configured to recognize formal or other special search terms, such as state names, country names, famous names, etc. such that, in the present example, a search term for "Albert Einstein" may be preserved as a single search term. The data indicative of the resource and the referral query may be received by the slot order prediction module 152 of the content item selection system 108, in some implementations.

A referral query location of the resource is determined (block 704). In some implementations, the slot order prediction module 152 may determine the referral query location of the resource. In other implementations, other modules of the content item selection system 108 may determine the referral query location. The referral query location is determined based on the referral query and data indicative of the content of the resource. That is, one or more terms of the referral query may be compared to the data indicative of the content of the resource. In some implementations, a single referral query location may be determined based on the best match of the content of the resource to the terms of the referral query. In other implementations, several referral query locations may be determined. For example, if the referral query (i.e., the search query that resulted in the user of the client device selecting the hyperlink for the resource) is "When and where was Albert Einstein born?," then the slot order prediction module 152 may parse through the data indicative of the content of the resource to determine a referral query location that is responsive to the referral query. That is, based on the query presented of "When and where was Albert Einstein born?," the slot order prediction module 152 determines the location in the content of the resource (e.g., the text having the location and date of birth) that is responsive to the query.

A content item slot order for the set of content item slots is determined based, at least in part, on a corresponding proximity of a corresponding location of each content item slot of the set of content item slots (block 706) relative to the referral query location. For example, a content item slot that is nearest to the referral query location may be first in the order and a content item slot that is furthest from the referral query location may be last in the order. In some implementations, the determining of the content item slot order for the set of content item slots may be further based, at least in part, on a set of outputs from a predictive model. Each output of the set of outputs corresponds to a content item slot of the set of content item slots. The predictive model and the corresponding outputs may be substantially similar to that described above in reference to block 506 of FIG. 5. The predictive model may be based on aggregate historical data of interactions with the resource, which may include data indicative of whether the first content item slot was viewed, data indicative of whether the second content item slot was viewed, data indicative of a direction of scrolling, data indicative of a viewable area of the resource associated with the referral query location, and/or other data described herein.

Data to effect display of a first content item associated with a first content item slot based on the content item slot order may be served to a client device or a resource server (block 708). The data may be transmitted from the content item selection system 108 to a client device 110 and/or resource server 104 via the network 106. In some implementations, the first content item is selected based, at least in part, on a value from a content item auction. The value may include a bid value, a score value, a relevance value, a pCTR value, a pCVR value, etc. Of course, other values may be used to determine which content item is selected to be displayed in each content item slot of the order.

In some implementations, data to effect display of a second content item associated with a second content item slot based on the content item slot order may be served to a client device or a resource server (block 710). The data may be transmitted from the content item selection system 108 to a client device 110 and/or resource server 104 via the network 106. The second content item slot may be after the first content item slot in the content item slot order. In some implementations, the second content item is selected based, at least in part, on a value from a content item auction. The value may include a bid value, a score value, a relevance value, a pCTR value, a pCVR value, etc. Of course, other values may be used to determine which content item is selected to be displayed in each content item slot of the order.

Figure 8:
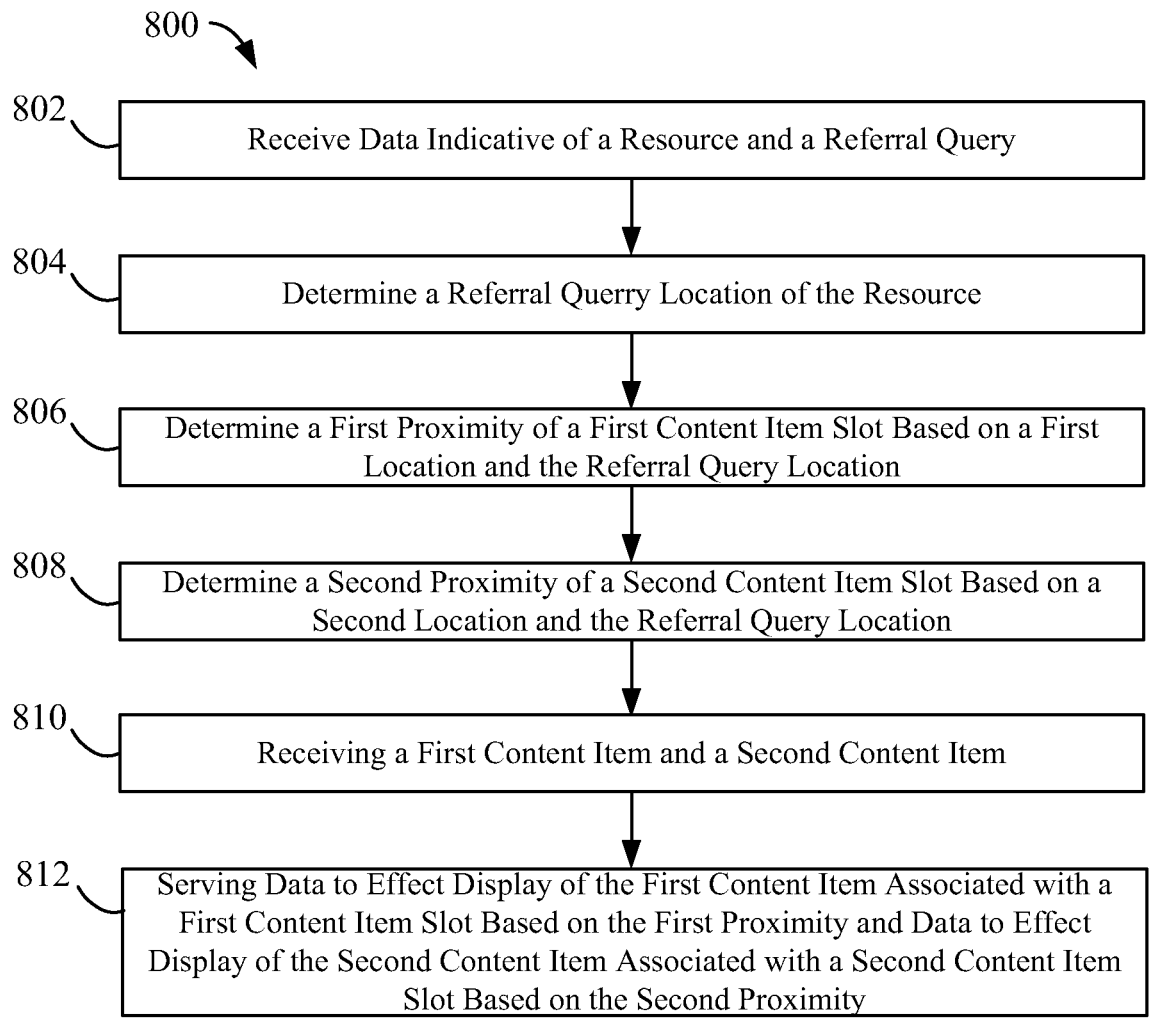
FIG. 8 is a flow diagram of an implementation of a process for serving selected content items in the content item slots based on a proximity of a content item slot to a referral query location.

FIG. 8 depicts still another implementation of a process 800 for determining an order for content item slots and serving data to effect display of content items in the content item slots based on the order. The process 800 includes receiving data indicative of a resource and a referral query (block 802). The data indicative of the resource may include data indicative of the content of the resource and data indicative of the locations of one or more content item slots relative to the content of the resource. The data indicative of the resource may include code for the resource, such as HTML code. The resource may include one or more content item slots. In some implementations, the resource may include a first content item slot at a first location and a second content item slot at a second location.

The data indicative of the referral query may include one or more search terms used in a search query that the resource was selected as responsive to. Using the above example, a search query for "When and where was Albert Einstein born?" may be parsed into search terms of "When," "and," "where," "was," "Albert," "Einstein," and "born." In some implementations, stop words (e.g., words such as "a," "and," "or" etc.) may be removed from the search query terms. In some implementations, the search query may be configured to recognize formal or other special search terms, such as state names, country names, famous names, etc. such that, in the present example, a search term for "Albert Einstein" may be preserved as a single search term. The data indicative of the resource and the referral query may be received by the slot order prediction module 152 of the content item selection system 108, in some implementations.

A referral query location of the resource is determined (block 804). The determination of the referral query location of the resource may be substantially similar to that described above in reference to block 504 of FIG. 5.

The process 800 further includes determining a first proximity of a first content item slot based on the first location and the referral query location (block 806). In some implementations, the proximity may be a vertical distance from the first location to the referral query location. In other implementations, such as resources having offset content item slots, such as those shown in FIG. 3, the proximity may include a horizontal distance, either in addition to or in lieu of the vertical distance.

The process 800 also includes determining a second proximity of a second content item slot based on the second location and the referral query location (block 806). In some implementations, the proximity may be a vertical distance from the first location to the referral query location. In other implementations, such as resources having offset content item slots, such as those shown in FIG. 3, the proximity may include a horizontal distance, either in addition to or in lieu of the vertical distance. In some instances, the first proximity may be less than the second proximity. In other instances, the first proximity may be greater than the second proximity. In still other instances, the first proximity and the second proximity may be substantially equal.

The process 800 includes receiving a first content item and a second content item (block 810). In some implementations, the first content item and the second content item may be selected based on a ranking of third-party content items performed by the content item selection module 150 of the content item selection system 108. In an implementation, the content item selection module 150 may rank several third-party content items based on an auction. In other implementations, the content item selection module 150 may rank the third-party content items based on a bid value, a score value, a relevance value, a pCTR value, a pCVR value, etc. The content item selection module 150 may select the first content item and the second content item based on the content items being the first and second content items in the resulting ranking, respectively.

Data to effect display of the first content item associated with a first content item slot based on the first proximity and data to effect display of the second content item associated with a second content item slot based on the second proximity may be served to a client device or a resource server (block 812). The data may be transmitted from the content item selection system 108 to a client device 110 and/or resource server 104 via the network 106.

In some implementations, the first content item is associated with a first bid value and the second content item is associated with a second bid value. The first bid value may be greater than the second bid value. The first content item may be associated with the first content item slot further based, at least in part, on the first bid value and the second content item may be associated with the second content item slot further based, at least in part, on the second bid value. In some implementations, the first content item may be associated with the first content item slot further based on a first output of a predictive model and the second content item may be associated with the second content item slot further based on a second output of the predictive model. The predictive model and the corresponding outputs may be substantially similar to that described above in reference to block 506 of FIG. 5. The predictive model may be generated based, at least in part, on aggregate historical data of interactions with the resource, which may include data indicative of whether the first content item slot was viewed, data indicative of whether the second content item slot was viewed, data indicative of a direction of scrolling, data indicative of a viewable area of the resource associated with the referral query location, and/or other data described herein.

Figure 9:
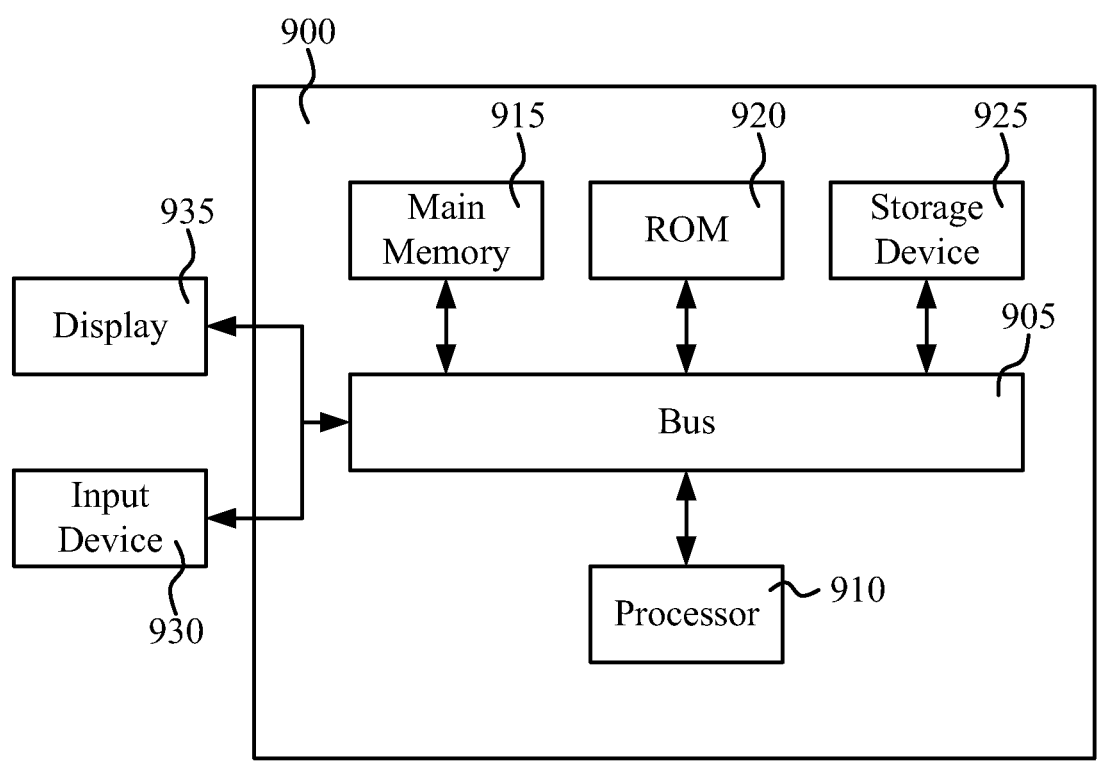
FIG. 9 is a block diagram illustrating a general architecture for a computer system that may be employed to implement various elements of the systems and methods described and illustrated herein.

FIG. 9 is a block diagram of a computer system 900 that can be used to implement the client device 110, content item selection system 108, third-party content server 102, resource server 104, etc. The computing system 900 includes a bus 905 or other communication component for communicating information and a processor 910 or processing module coupled to the bus 905 for processing information. The computing system 900 can also include one or more processors 910 or processing modules coupled to the bus for processing information. The computing system 900 also includes main memory 915, such as a RAM or other dynamic storage device, coupled to the bus 905 for storing information, and instructions to be executed by the processor 910. Main memory 915 can also be used for storing position information, temporary variables, or other intermediate information during execution of instructions by the processor 910. The computing system 900 may further include a ROM 920 or other static storage device coupled to the bus 905 for storing static information and instructions for the processor 910. A storage device 925, such as a solid state device, magnetic disk or optical disk, is coupled to the bus 905 for persistently storing information and instructions. Computing device 900 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 900 may be coupled via the bus 905 to a display 935, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 930, such as a keyboard including alphanumeric and other keys, may be coupled to the bus 905 for communicating information and command selections to the processor 910. In another implementation, the input device 930 may be integrated with the display 935, such as in a touch screen display. The input device 930 can include a cursor control, such as a mouse, a trackball, or cursor direction keys, for communicating direction information and command selections to the processor 910 and for controlling cursor movement on the display 935.

According to various implementations, the processes and/or methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes and/or method steps described herein. One or more processors in a multi-processing arrangement may also be employed to execute the instructions contained in main memory 915. In alternative implementations, hard-wired circuitry may be used in place of or in combination with software instructions to effect illustrative implementations. Thus, implementations are not limited to any specific combination of hardware circuitry and software.

Although an implementation of a computing system 900 has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," "processing circuit," or "processing module" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method comprising:
 receiving, by one or more processors, from respective client devices accessing a resource, interaction data captured via a first script included in the resource and configured to execute on the respective client devices;
 maintaining, by the one or more processors, based on the interaction data, in one or more data structures, a first metric of a first content item slot on the resource based on a first number of times the first content item slot was viewed or interacted with;
 maintaining, by the one or more processors, based on the interaction data, in the one or more data structures, a second metric of a second content item slot on the resource based on a second number of times the second content item slot was viewed or interacted with;
 determining, by the one or more processors, a first priority of the first content item slot and a second priority of the second content item slot based on a comparison of the first metric and the second metric, the first priority and the second priority used to assign content items to the first content item slot and the second content item slot;
 generating, by the one or more processors, a second script, wherein the second script causes the client device to modify the first priority and the second priority based on a direction of scrolling received from an input device of the client device;
 receiving, by the one or more processors, from a client device, a request to access the resource;
 selecting, by the one or more processors, based on one or more content selection parameters used to select content items for display on the resource and responsive to the request, a first content item and a second content item for display on the resource;
 assigning, by the one or more processors, based on the first priority of the first content item slot determined based on the first metric of the first content item slot, the first content item to the first content item slot located in a first location on the resource;
 assigning, by the one or more processors, based on the second priority of the second content item slot determined based on the second metric of the second content item slot, the second content item to the second content item slot located in a second location on the resource, the second location different from the first location; and
 transmitting, by the one or more processors, to the client device responsive to the request, (i) data to effect display of the first content item in the first content item slot, (ii) data to effect display of the second content item in the second content item slot, and (iii) the second script to effect display of the first content item in the second content item slot and effect display of the second content item in the first content item slot.

2. The method of claim 1, wherein the interaction data comprises data indicative of a direction of scrolling.

3. The method of claim 1, wherein the interaction data comprises data indicative of a viewable area of the resource.

4. The method of claim 1 further comprising:
 receiving, at the one or more processors, client data associated with the client device, wherein the first priority of the first content item slot and the second priority of the second content item slot are further based on the client data associated with the client device.

5. The method of claim 1 further comprising:
 storing, by the one or more processors, the first priority, the second priority and a referral query, wherein the first priority and the second priority are associated with the referral query.

6. The method of claim 1, wherein selecting the first content item and the second content item further comprises:
 determining, by the one or more processors, a first rank of the first content item and a second rank of the second content item; and
 selecting, by the one or more processors, the first content item for display in the first content item slot and the second content item for display in the second content item slot based on the priorities and the ranks of the first content item and the second content item.

7. A system comprising:
 one or more processors coupled to memory, the one or more processors configured to:
  receive, from respective client devices accessing a resource, interaction data captured via a first script included in the resource and configured to execute on the respective client devices;
  maintain, based on the interaction data, in one or more data structures, a first metric of a first content item slot on the resource based on a first number of times the first content item slot was viewed or interacted with;
  maintain, based on the interaction data, in the one or more data structures, a second metric of a second content item slot on the resource based on a second number of times the second content item slot was viewed or interacted with;
  determine a first priority of the first content item slot and a second priority of the second content item slot based on a comparison of the first metric and the second metric, the first priority and the second priority used to assign content items to the first content item slot and the second content item slot;
  generate a second script that causes the client device to modify the first priority and the second priority based on a direction of scrolling received from an input device of the client device;
  receive, from a client device, a request to access the resource;
  select, based on one or more content selection parameters used to select content items for display on the resource and responsive to the request, a first content item and a second content item for display on the resource;
  assign, based on the first priority of the first content item slot determined based on the first metric of the first content item slot, the first content item to the first content item slot located in a first location on the resource;
  assign, based on the second priority of the second content item slot determined based on the second metric of the second content item slot, the second content item to the second content item slot located in a second location on the resource, the second location different from the first location; and transmit, to the client device responsive to the request, (i) data to effect display of the first content item in the first content item slot, (ii) data to effect display of the second content item in the second content item slot, and (iii) the second script to effect display of the first content item in the second content item slot and effect display of the second content item in the first content item slot.

8. The system of claim 7, wherein the interaction data comprises data indicative of a direction of scrolling.

9. The system of claim 7, wherein the interaction data comprises data indicative of a viewable area of the resource.

10. The system of claim 7, wherein the one or more processors are further configured to receive, client data associated with the client device, wherein the first priority of the first content item slot and the second priority of the second content item slot are further based on the client data associated with the client device.

11. The system of claim 7, wherein the one or more processors are further configured to store, in a memory module, the first priority, the second priority and a referral query, wherein the first priority and the second priority are associated with the referral query.

12. The system of claim 7, wherein selecting the first content item and the second content item further comprises:
determining, by the one or more processors, a first rank of the first content item and a second rank of the second content item; and
selecting, by the one or more processors, the first content item for display in the first content item slot and the second content item for display in the second content item slot based on the priorities and the ranks of the first content item and the second content item.

13. A non-transitory computer readable medium storing instructions that, when executed by one or more processors, cause the one or more processors to perform operations comprising:
receiving, from respective client devices accessing a resource, interaction data captured via a first script included in the resource and configured to execute on the respective client devices;
maintaining, based on the interaction data, in one or more data structures, a first metric of a first content item slot on the resource based on a first number of times the first content item slot was viewed or interacted with;
maintaining, based on the interaction data, in the one or more data structures, a second metric of a second content item slot on the resource based on a second number of times the second content item slot was viewed or interacted with;
determining a first priority of the first content item slot and a second priority of the second content item slot based on a comparison of the first metric and the second metric, the first priority and the second priority used to assign content items to the first content item slot and the second content item slot;
generating, by the one or more processors, a second script, wherein the second script causes the client device to modify the first priority and the second priority based on a direction of scrolling received from an input device of the client device;
receiving, from a client device, a request to access the resource;
selecting, based on one or more content selection parameters used to select content items for display on the resource and responsive to the request, a first content item and a second content item for display on the resource;
assigning, based on the first priority of the first content item slot determined based on the first metric of the first content item slot, the first content item to the first content item slot located in a first location on the resource;
assigning, based on the second priority of the second content item slot determined based on the second metric of the second content item slot, the second content item to the second content item slot located in a second location on the resource, the second location different from the first location; and
transmitting, to the client device responsive to the request, (i) data to effect display of the first content item in the first content item slot, (ii) data to effect display of the second content item in the second content item slot, and (iii) the second script to effect display of the first content item in the second content item slot and effect display of the second content item in the first content item slot.

14. The non-transitory computer readable medium of claim 13, wherein the interaction data comprises data indicative of at least one of: whether the first content item or the second content item slot was viewed, a direction of scrolling, and a viewable area of the resource.

* * * * *